United States Patent [19]

Tuttle

[11] Patent Number: 5,575,513
[45] Date of Patent: Nov. 19, 1996

[54] AUTOMOBILE HOOD STRUT LOCK

[76] Inventor: Willis A. Tuttle, 422 W. Galer, Seattle, Wash. 98119

[21] Appl. No.: 385,138

[22] Filed: Apr. 3, 1995

[51] Int. Cl.⁶ .................................................. E05C 17/54
[52] U.S. Cl. ........................... 292/339; 267/64.12; 16/82
[58] Field of Search .................................... 292/338, 339, 292/288; 16/82, 49; 188/300; 267/64.12

[56] References Cited

U.S. PATENT DOCUMENTS

| | | | |
|---|---|---|---|
| 3,708,825 | 1/1973 | Wood | 16/49 |
| 4,596,383 | 6/1986 | Howard | 267/64.12 |
| 4,634,170 | 1/1987 | Lach | 267/64.12 |
| 4,744,548 | 5/1988 | Hathaway | 292/338 X |
| 4,813,100 | 3/1989 | King | 16/82 X |
| 4,824,082 | 4/1989 | Schaupp | 267/64.12 X |
| 4,865,169 | 9/1989 | Rachels et al. | 16/82 X |
| 5,358,225 | 10/1994 | Volpel et al. | 267/64.12 |

FOREIGN PATENT DOCUMENTS

| | | | |
|---|---|---|---|
| 2654156 | 6/1978 | Germany | 292/338 |
| 3937186 | 6/1991 | Germany | 292/338 |
| 2139282 | 11/1984 | United Kingdom | 292/338 |

*Primary Examiner*—Rodney M. Lindsey
*Attorney, Agent, or Firm*—Robt. W. Beach

[57] ABSTRACT

A receptacle for propping the cylinder of a cylinder-and-plunger strut in extended position of the strut includes two side-by-side cylindrical chambers, one being of a size to embrace the jack plunger rod but not the jack cylinder and the other chamber being of a size to slide over the jack cylinder, which chambers are interconnected by a slot sufficiently narrower than the jack plunger rod to enable the receptacle to move into a position embracing the jack plunger rod by snap action, and the larger chamber being of a size to slide lengthwise over the cylinder and having in it a lengthwise slot sufficiently narrow so as not to be able to pass the cylinder through it but sufficiently wide to pass the plunger rod through it.

5 Claims, 2 Drawing Sheets

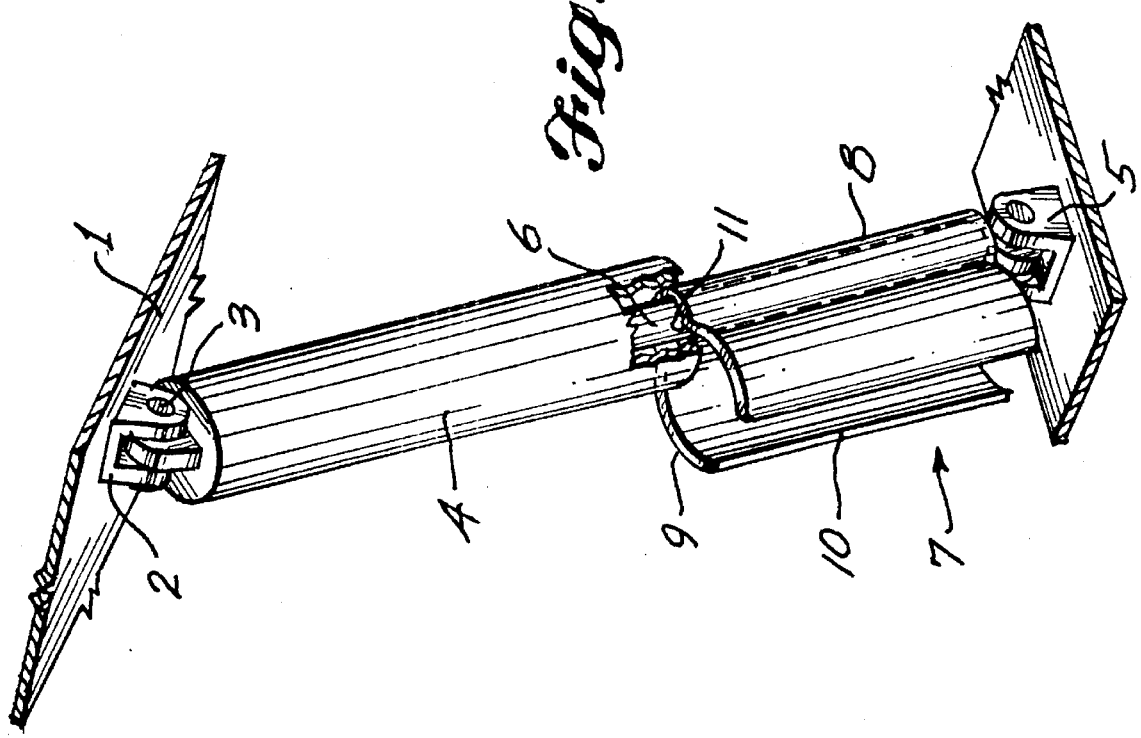
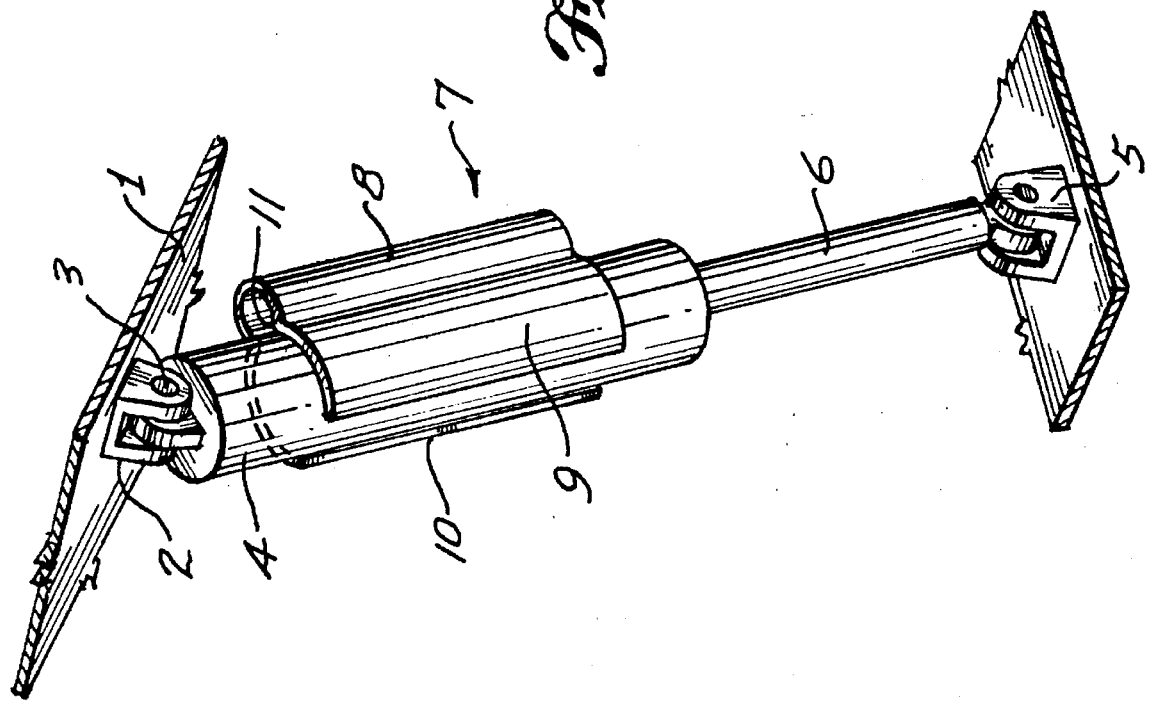

AUTOMOBILE HOOD STRUT LOCK

BACKGROUND OF THE INVENTION

1. Field of the Invention

This invention relates to an automobile hood strut lock and more particularly to a cylinder prop for supporting a cylinder of a jack cylinder-and-plunger to prevent or limit retraction of the plunger rod into the cylinder.

2. Prior Art

Various devices have been proposed heretofore to prop a cylinder for preventing a plunger rod from retracting into the cylinder, but these devices have had disadvantages of being complicated or difficult to operate or unreliable to insure that the cylinder is held reliably to prevent or limit retraction of the plunger rod into the cylinder.

SUMMARY OF THE INVENTION

A principal object of the present invention is to provide a prop for the cylinder of a cylinder-and-plunger strut to prevent or limit contraction of the strut by movement of the plunger rod into the cylinder.

It is also an object to render the prop operative quickly and easily.

Another object is to enable the prop to be inactivated readily for enabling the plunger rod to retract into the cylinder and to be able to store the prop conveniently for subsequent use.

A further object is to provide a cylinder prop which is reliable in operation and will not be dislodged inadvertently to enable the cylinder-and-plunger combination to contract appreciably by movement of the plunger rod inwardly of the cylinder.

The foregoing objects can be accomplished by a double chamber receptacle having side-by-side chambers, preferably of cylindrical cross section, including a smaller chamber for embracing the plunger rod of a cylinder-and-plunger jack for propping the cylinder to maintain the cylinder-and-plunger combination in extended relationship and the other chamber being sufficiently larger to embrace the cylinder, and the receptacle having an internal slot communicating between the plunger rod chamber and the cylinder chamber for enabling the receptacle to be moved transversely between an operative position in which the smaller chamber embraces the plunger rod and can prop the cylinder to prevent the plunger rod moving appreciably into the cylinder and an inoperative or stored condition in which the smaller chamber is moved out of registration with the plunger rod and the larger chamber is in registration with the plunger rod and cylinder for enabling the larger chamber of the receptacle to be slid lengthwise over the cylinder for storing the receptacle in such inoperative position.

BRIEF DESCRIPTION OF THE DRAWINGS

FIG. 2 is an enlarged top perspective of the extensible strut or jack showing the prop of the present invention in operative position, parts being broken away;

FIG. 3 is a top perspective of an extensible strut or jack on an enlarged scale and in extended condition with the receptacle of the present invention in stored position.

DETAILED DESCRIPTION

Figure 1:
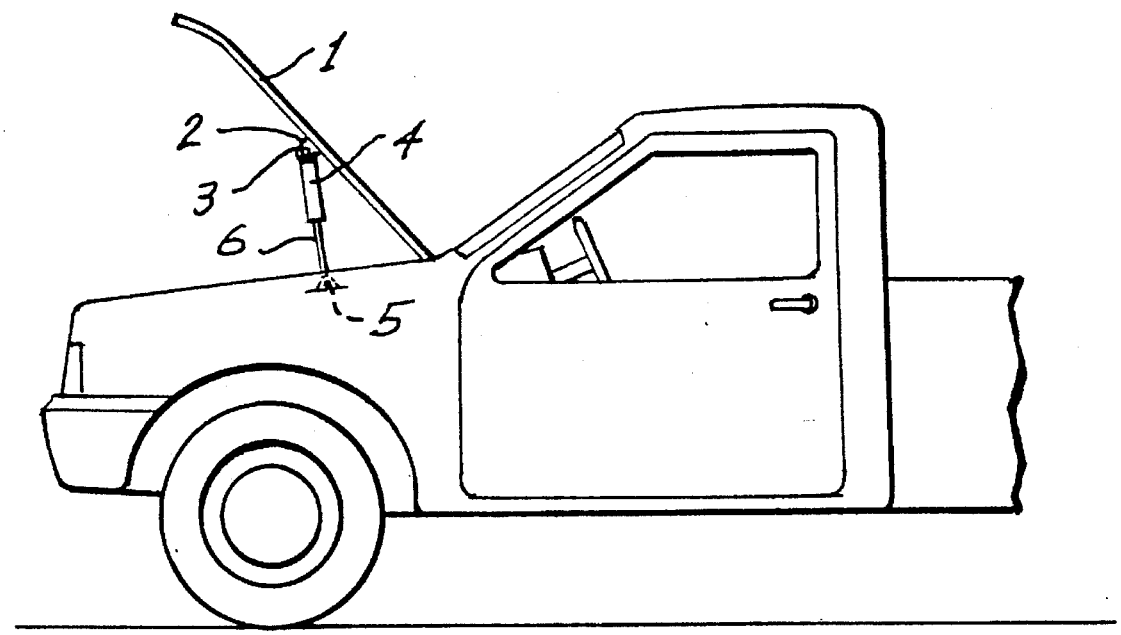
FIG. 1 is a side elevation of an extensible cylinder-and-plunger strut or jack installation with which the present invention can be used.

The receptacle of the present invention is utilized as a prop for the cylinder of an extensible cylinder-and-plunger strut or jack that is customarily used in extended condition for holding open the engine compartment hood or trunk lid of an automobile to prevent inadvertent appreciable contraction of the strut or jack. A typical representative installation of an extensible strut or jack for holding open an automobile engine compartment hood is shown in FIG. 1. The engine compartment hood 1 can be held open by a jack attached to it by a bracket 2 and a hinge 3 connected to the cylinder 4 of the jack. The other end of the jack is attached to the body of the automobile by a bracket and hinge 5 connected to the outer end of the plunger rod 6 of the jack.

While such jacks are designed to be maintained in extended condition for holding the engine compartment hood 1 or an automobile trunk lid in raised position, such jacks are not always reliable, and it is desirable to provide a positive prop for the cylinder which will prevent the plunger rod 6 from retracting appreciably into the cylinder 4 inadvertently so that the engine compartment hood or automobile trunk lid can not swing closed, usually without warning, which may cause the hood or lid to strike the head, arm, hand or other part of a worker extended into the engine compartment or trunk.

FIG. 2 shows the installation of a receptacle according to the present invention which can positively prevent inadvertent appreciable contraction of the cylinder 4 and plunger rod 6 by movement of the plunger rod inwardly of the cylinder. Such elongated receptacle 7 has double chambers arranged in side-by-side relationship including a chamber 8 of smaller cross section, preferably of cylindrical shape and of a size to embrace the plunger rod 6, and a chamber 9 of larger cross section, also preferably of cylindrical shape and of a size to embrace the cylinder 4. In operative position, the plunger rod chamber 8 will embrace the plunger rod 6 as shown in FIG. 2 in such position, being interposed between the cylinder 4 and the jack attachment 5 so as to form a strut which will prevent the plunger rod 6 from retracting appreciably into the cylinder 4.

One of the double chambers, shown in FIG. 2 and FIG. 3 as the larger cylinder chamber 9, has in the side remote from the chamber 8 an elongated slot 10 extending the full length of the chamber and of a width which will pass the plunger rod 6 but will not pass the cylinder 4. The receptacle can be applied to the jack by passing the slot 10 over the plunger rod 6 so that the plunger rod will be lodged in the larger chamber 9.

The receptacle also has a slot 11 which connects the smaller plunger rod chamber 8 and the larger cylinder chamber 9 and is of a width to pass the plunger rod 6 so that the receptacle can be moved transversely of the length of the chambers 8 and 9 to move the chamber 8 into registration with the plunger rod 6 as shown in FIG. 2, in which position the portion of the receptacle forming the chamber 8 will function as a prop to limit movement of the plunger rod 6 into the cylinder 4. As shown in FIG. 2, it is not necessary that the smaller chamber 8 embrace the plunger rod 6 closely, but the slot 11 should be sufficiently narrow to provide a snap action as the receptacle 7 is moved relative to the plunger rod 6 to pass the plunger rod through the slot 11 in either direction.

Figure 4:
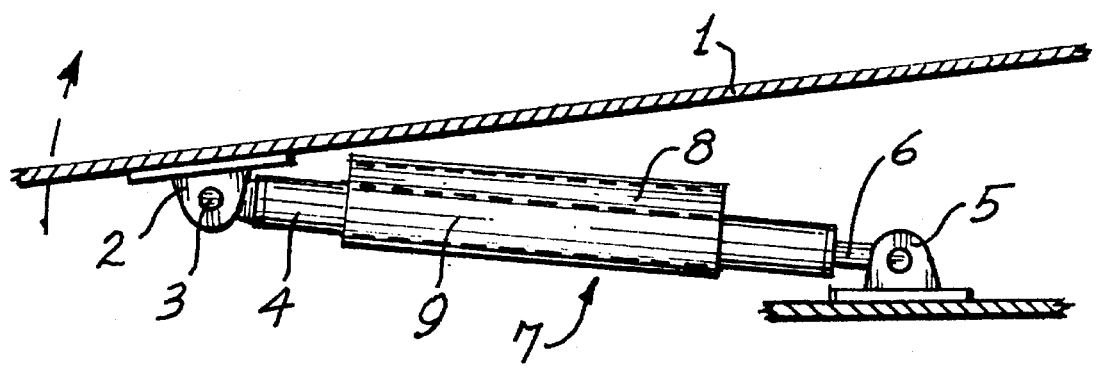
FIG. 4 is a side elevation of the extensible strut or jack installation with the strut or jack in contracted condition.

In order to make the receptacle 7 readily available for use as a prop for cylinder 4 in the manner explained above, the receptacle can be moved transversely of its length from the position shown in FIG. 2, where it is operative to serve as a prop for the cylinder 4, into the inoperative position relative to the plunger 6 rod shown in FIGS. 3 and 4. When the receptacle is moved transversely of the chambers 8 and 9 from the position of FIG. 2 to pass the plunger rod 6 through the slot 11 to place the plunger rod in registration with the larger chamber 9, the receptacle will no longer be operative to serve as a prop for holding the cylinder 4 in extended relationship relative to the plunger rod 6, but the chamber 9 can be slid lengthwise over the cylinder 4 to place the receptacle in the stored position shown in FIGS. 3 and 4. The receptacle is held captive in such stored position because the slot 10 is of a width less than the external diameter of the cylinder 4 so that the cylinder cannot be moved through such slot.

When the receptacle is stored in this position on the cylinder 4 the engine compartment hood can be closed to the position shown in FIG. 4. When the hood is raised and the strut or jack is in extended condition, the receptacle 7 is immediately available for movement lengthwise of the cylinder into a position in registration with the plunger rod 6 and then, by movement transversely of the chambers 8 and 9, the plunger rod can be moved into the smaller chamber 8 to be placed in the operative position shown in FIG. 2 where the casing of chamber 8 will function as a prop to limit movement of plunger rod 6 into cylinder 4.

As shown in the drawings, the receptacle is made of sheet material shaped to form the smaller chamber 8 and the larger chamber 9 in side-by-side relationship and to form the internal slot 11 of a width to afford snap engagement with the plunger rod 6.

I claim:

1. A lock device for maintaining a jack cylinder and plunger in extended condition, comprising a receptacle having side-by-side chambers, one of said chambers being a plunger chamber for embracing the jack plunger for propping the cylinder and plunger in extended condition and the other of said chambers being a cylinder chamber for embracing the jack cylinder when the cylinder and plunger are contracted from their extended condition for maintaining said receptacle in captive condition relative to the jack, said receptacle having an internal slot communicating between said plunger chamber and said cylinder chamber for passage of the jack plunger transversely therethrough between said cylinder chamber and said plunger chamber.

2. The lock device defined in claim 1, in which the internal slot provides a snap action engagement with the plunger as it is moved through the slot into the plunger chamber.

3. The lock device defined in claim 1, in which one of the chambers has in it an outer slot for passage of the jack plunger transversely therethrough to free the receptacle from the jack plunger.

4. The lock device defined in claim 3, in which the outer slot is in the cylinder chamber.

5. The lock device defined in claim 1, in which the jack cylinder is of circular cross section and the jack plunger is of circular cross section, the receptacle is of sheet material, the cylinder chamber having opposite interior walls which are concave complemental to the curvature of the exterior of the jack cylinder, and the plunger chamber having opposite interior walls which are concave complemental to the curvature of the exterior of the jack plunger.

\* \* \* \* \*